No. 719,201. PATENTED JAN. 27, 1903.
J. J. DEERY.
LIQUID PURIFYING SYSTEM.
APPLICATION FILED AUG. 3, 1901.
NO MODEL. 2 SHEETS—SHEET 1.
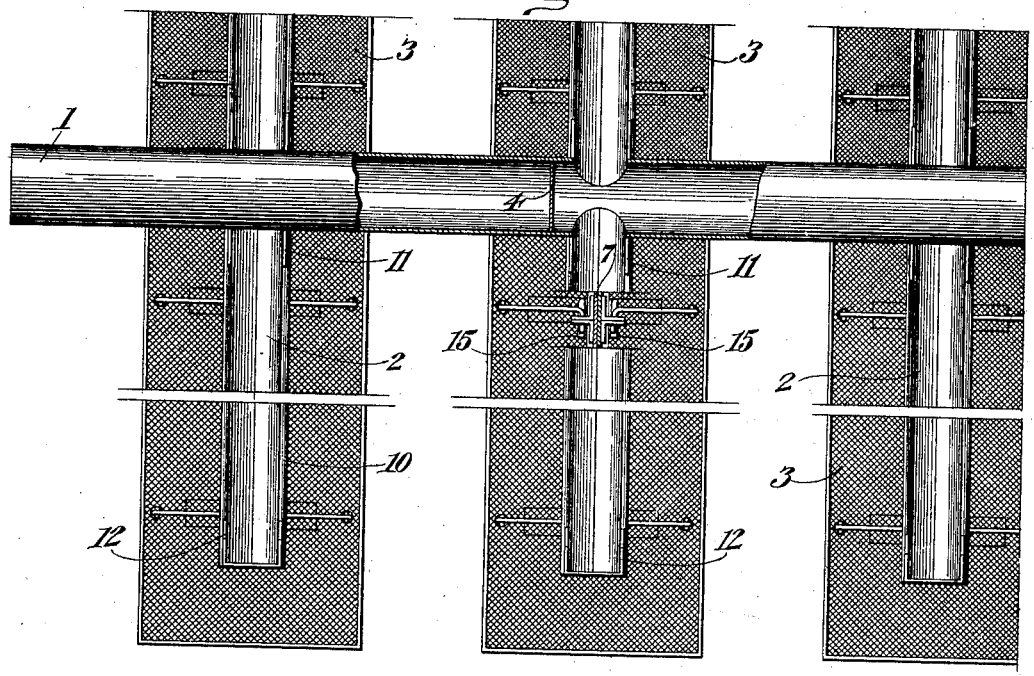
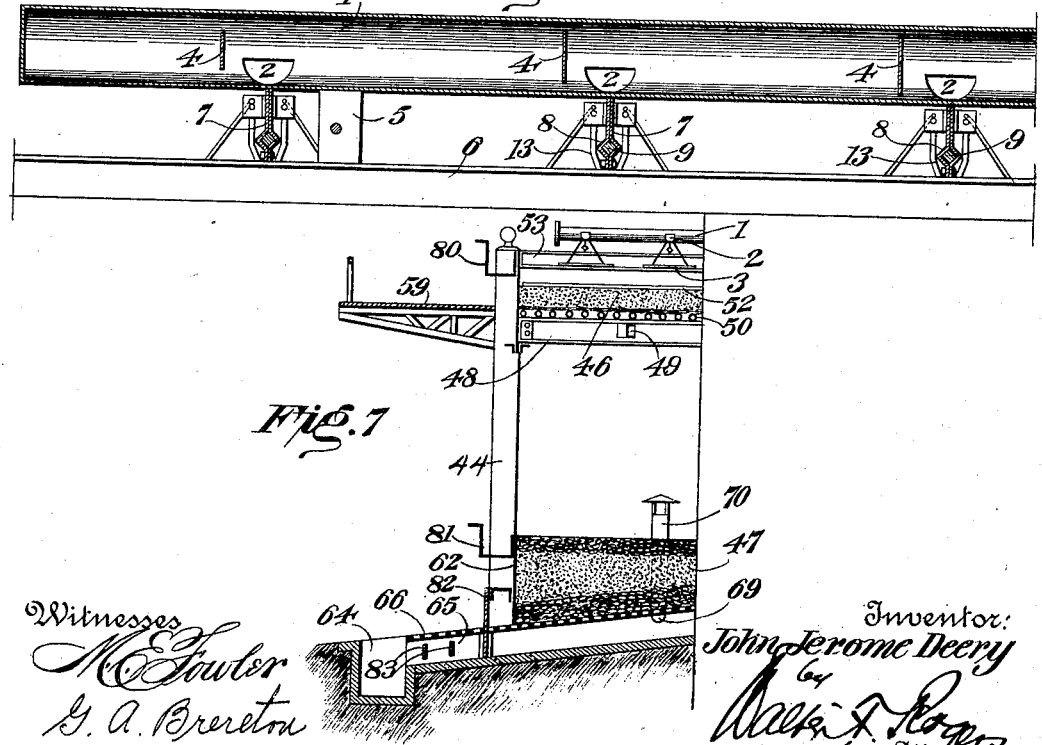
Witnesses
M. E. Fowler
G. A. Brereton
Inventor:
John Jerome Deery No. 719,201. PATENTED JAN. 27, 1903.
J. J. DEERY.
LIQUID PURIFYING SYSTEM.
APPLICATION FILED AUG. 3, 1901.
NO MODEL. 2 SHEETS—SHEET 2.
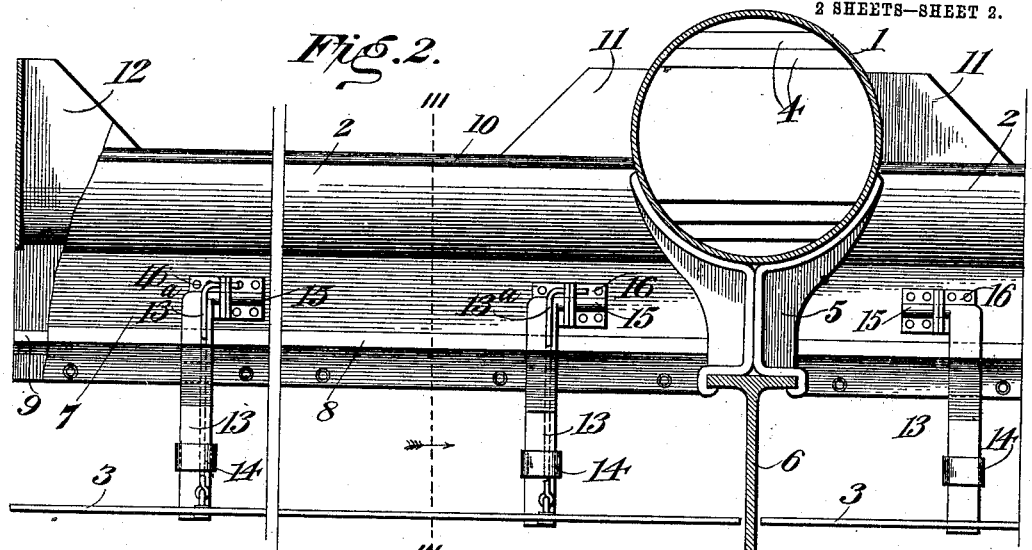
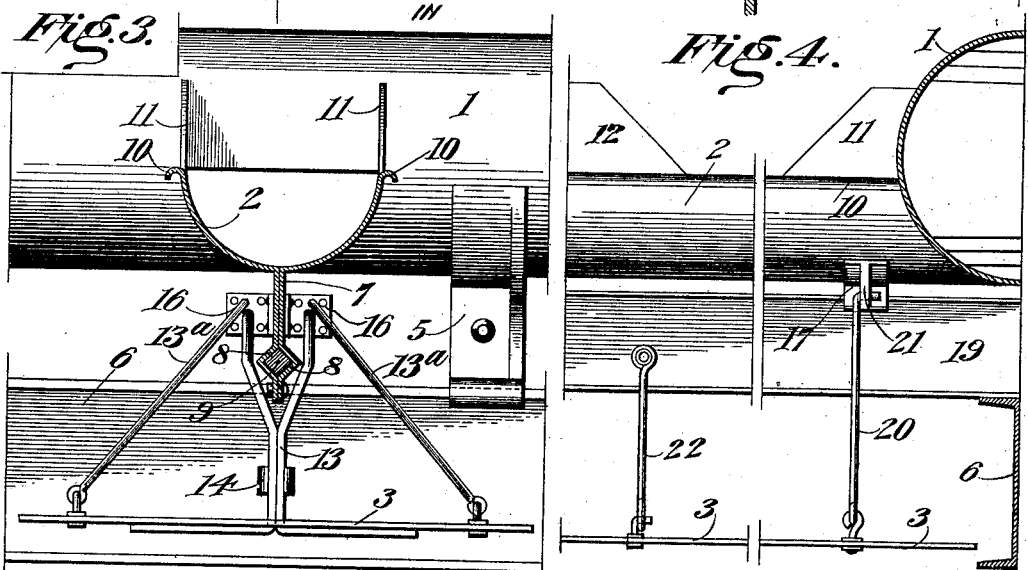
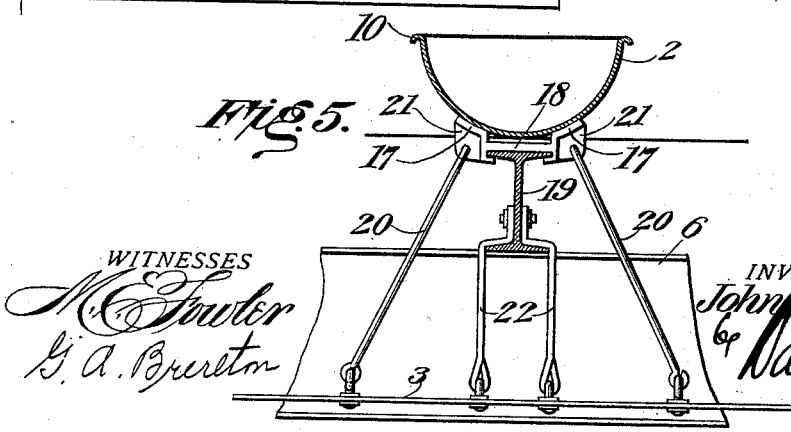
WITNESSES
M. E. Fowler
G. A. Brereton
INVENTOR:
John Jerome Deery
by Walter T. Rogers
Attorney

UNITED STATES PATENT OFFICE.

JOHN JEROME DEERY, OF PHILADELPHIA, PENNSYLVANIA.

LIQUID-PURIFYING SYSTEM.

SPECIFICATION forming part of Letters Patent No. 719,201, dated January 27, 1903.

Application filed August 3, 1901. Serial No. 70,803. (No model.)

*To all whom it may concern:*

Be it known that I, JOHN JEROME DEERY, a citizen of the United States, residing at Philadelphia, in the county of Philadelphia and State of Pennsylvania, have invented certain new and useful Improvements in Purifying Water, Sewage, &c.; and I do hereby declare the following to be a full, clear, and exact description of the invention, such as will enable others skilled in the art to which it appertains to make and use the same.

My invention relates to the purification of water, sewage, or other liquids. Its object is to oxidate and oxygenate the liquid and subject it to photochemical and electric action and to distribute the liquid uniformly over filter-beds and to maintain an even and regular surface on the filter-beds.

To this end it comprises a distributing system from which the water flows in thin films, falling through the air upon splash-plates, preferably perforated or reticulated, and again falling in globules or sprays through the air to collecting apparatus directly or indirectly by way of filters, drains, &c., so that the water or other liquid is thoroughly treated by the chemical action of the oxygen of the air, the rays of light, and the incidental electrization.

I have devised an apparatus especially effective in carrying out the purposes of my invention. It is to be understood, however, that my apparatus may assume various mechanical forms and that the drawings are designed merely to illustrate the inventive idea and do not define the limits thereof.

In the accompanying drawings, Figure 1 is a broken plan view of some of the distributing devices and the splash-plates. Fig. 2 is a side elevation of a section of my system. Fig. 3 is a section of the line III III of Fig. 2. Fig. 4 is a broken side elevation of a modification of the sustaining and suspending devices for the troughs and splash-plates. Fig. 5 is a section and elevation of the devices of Fig. 4. Fig. 6 is a longitudinal section of the main distributing-pipe with accompanying details, and Fig. 7 is a sectional detail illustrating the splash-plates applied to the filtering system and details of improvement.

In the drawings, 1 represents a distributer or main into which the liquid may flow from any source and which furnishes the supply to open troughs 2, arranged transversely with relation to the distributer.

3 represents splash-plates suspended beneath the troughs, and 4 represents deflectors or dams in the distributer, one just beyond each point of junction of a trough with the distributer.

The distributer is supported by brackets 5, resting upon a beam 6, or by suspension-hangers, or on piers or walls. Each of the troughs as here illustrated has its bottom substantially level with the bottom of the distributer and penetrates the distributer on opposite sides, though this in common with other details of the construction is subject to modification within the principles of my invention. Each trough is made of metal, preferably in sheets and in the form of Figs. 2 and 3, with an integral extension of each side below the body of the trough to serve as supports or beams to insure uniform level and to hold or suspend the splash-plates. Between the metal sides is a tension rod or bar 9, around which as a preferred construction the metal sides are bent, the sides as a whole being riveted or bolted together. By this means I provide in an economical manner a combined trough and beam-support. The trough has a curved rim 10 to guide the water and form it into a spreading sheet or film and also carries two sets of dams 11 and 12, the first on each side near the junction with the distributer to prevent the too sudden overflow of the water in its rush into the trough and the other around the end of the trough to prevent the overflow at the end, the object being to secure an even distribution of the water over the sides of the troughs in thin films as well as at the ends. The volume and velocity of the flow will of course determine the size of the dams.

The splash-plates 3 may, as stated, be either perforated or reticulated, preferably the latter, as shown, the object being to break the liquid into particles or globules. They are shown as extending beyond the troughs on the sides and end and are for each division of a trough; but this is merely illustrative and may be varied to follow mechanical necessities or plans. In Figs. 2 and 3 each plate is shown as suspended by rods or bars 13, clamped together at 14, passing beneath the plates and pintled at 15 in clips 16, formed, as shown, of four L-sections, (two on each side of the lower extension-trough 2,) riveted together and secured to and binding together by rivets or bolts the parts of the bracket 7. At 13ª are shown additional suspending-rods leading from the clips 16 to eyebolts on opposite ends of the splash-plates. These suspension bars or rods may be used separately or jointly.

In Figs. 4 and 5 I have shown a modified means of supporting the troughs and suspending the splash-plates. Two brackets 17 are joined by a web 18, forming in this case a solid casting, the trough lying on the curved faces of the brackets and the web resting upon the face of an I-beam 19, which in turn rests upon the beam 6. Rods 20 are swiveled or otherwise secured to wings 21 of the brackets 17, and at the other end to slip-bolts or other securing devices on the splash-plates. In Fig. 5 two hangers 22 are shown suspending the splash-plates from the I-beam 19. These may be used with or instead of the rods 20. The especial purpose of the sustaining devices for the trough and splash-plates is to secure a firm positioning and fixed relation of the parts, so that the flow and action of the liquid may be gaged with certainty and the distribution under all circumstances even and uniform.

It will be observed that the splash-plates can be readily removed to permit cleaning of the system or for other purposes. To the stated advantages of having the liquid broken up into globules or sprays there is the additional purpose in the use of the splash-plates with the filter-beds in that this distribution by means of drops or sprays prevents the formation of holes or cavities in the filtering material, thereby maintaining an even and regular surface on the filter-beds, while at the same time securing uniform distribution of the liquid over the entire area of the filter-beds.

The deflectors or dams 4 are, as shown in Fig. 6, preferably of different sizes, the largest being nearest the inflow of liquid and the others diminishing in size in proportion to the diminishing volume and velocity of the liquid.

In Fig. 7 I have applied my splash-plates to the filter system of my Patent No. 601,052, of March 22, 1898, with additional details of improvement. As in that patent, 44 represents posts or piers; 46, an elevated filter-bed; 47, a lower filter-bed; 50, a filter-support of separated pipes, rods, bars, or wires; 52, an upper grating of wood or metal; 53, transverse beams; 59, a platform; 62, outer boundary plates or walls of the lower filter-bed; 64, discharging-gutter; 65, transverse drains leading to the gutter; 66, perforated cover; 69, longitudinal pipes leading to the air-pipes 70. The splash-plates 3 and the screening-floor 52 may be used separately or jointly. It will be readily understood, even without reading the prior patent named, that the water or liquid falling from the splash-plates will percolate the upper filter-bed and then fall through the air upon the lower filter-bed and then through it to the transverse and other drains, finally discharging after having been both filtered and aerated and deriving the additional advantages of a thorough photochemical action and the electrization incident to the several impacts. The distributer, troughs, and splash-plates are shown suspended above the upper filter-bed. At 80 and 81 I have located gutters or channels for cleaning purposes. They may be made of metal, wood, masonry, or any suitable material, may be located as desired, and should connect with a suitable drainage system to remove the waste products to a convenient point. At 82 I have shown a stop-plank which may be inserted at the mouth of the collecting-drains to impound the water on the lower bed. The surface of the beds may be raked over, so that the sediment and coating will float to the top, thence from the sides of the lip or weir over into the gutters or channels, and finally to the drainage-discharge. At 83 are transverse strips or bars, preferably of metal, which may be termed "disturbers," their function being to intercept the flow and cause the liquid to rebound, thereby permitting it to be more thoroughly aerated. The conduit conveying the water, sewage, or other liquid to the main or distributer may be open or closed and controlled by any suitable automatic regulating-valve. The lines of distributers may be suspended from a roof by suitable hangers or supported on piers or brackets and may be either closed or opened ways of passage of the liquid to be purified. The troughs are shown as open and may have flat or beveled bottoms and sides, but are preferably of semicircular or semi-elliptical shape. The liquid in the troughs, shallow in depth, is in a state of fermentation and agitation and is purposely exposed to the direct rays of light and to the atmosphere, so as to destroy some of the malignant disease germs. In flowing over the edges of the open troughs in films the liquid absorbs, in the descent to the splash-plates, oxygen from the atmosphere and partially oxidizes the organic matter and bacteria within the liquid while the rays of light continue the work of destroying many micro-organisms. The liquid falling upon the reticulated splash-plates is separated by the impact into globules and all gases are expelled into the atmosphere. Each globule is being further purified by the action of the air, more oxygen being absorbed, thereby increasing the oxidation of the organic matter, and the small globules passing through the rays of light are further purified by the contact, thus accelerating and continuing the process of destroyal of the disease and malignant germs. Through the orifices in the splash-plates the liquid then percolates, some possibly spilling over the edges, and falls like drops of rain onto the surface of the filter-beds or the water upon them, whereby the liquid is further purified by renewed oxidation, aeration, and electrization. The electricity is produced by the falling drops of water coming in contact and by their concussion against the surface of the water. The liquid being partially purified is in excellent condition for rapidity of purification in its transit through my patented system of filter-beds, where the purification continues in the action of the more hardy species of bacteria or organisms producing nitrification of the malignant disease germs. At the same time all sediment and matter in suspension is held upon the surface of the bed, while the effluent is the perfection of drinking-water, being chemically and bacterially pure, as it is thoroughly oxygenated or aerated after the preceding process of purification.

Having fully described my invention, what I claim is—

1. In a liquid-purifying system, the combination of distributing means, and means for delivering the liquid in films or sheets, with substantially horizontal splash-plates located in the path of the films or sheets, so as to break them up into drops or globules.

2. In a liquid-purifying system, the combination of distributing means, and means for delivering the liquid in films or sheets, with level and perforated or reticulated splash-plates located in the path of the films or sheets.

3. A system for filtering water, sewage or liquids, comprising a supplying means, a main distributer, a series of branch distributers, substantially horizontal splash-plates arranged beneath said branch distributers, a bed of filtering material, drains or aerating-ducts, and means in said drains or aerating-ducts for causing the further aerating of the water.

4. A system for filtering water, sewage or other liquids, comprising a filter-bed, means for supplying the liquid to be filtered thereto, drains or ducts for the filtered liquid beneath said bed, and disturbers in the path of the filtered liquid below the filter-bed.

5. A system for filtering water, sewage or liquids, comprising supplying means, a series of distributers and branch distributers, a bed of filtering material, means for breaking the water into particles to aerate it situated between said branch distributers and bed, drains or ducts beneath the bed, a collecting drain or gutter to receive the filtered water and disturbers situated across the path of the water in the collecting-drain.

6. In a liquid-purifying system, the combination of distributing pipes or troughs and splash-plates, clips or brackets from which the splash-plates are swung, and bracket-supports for the troughs, the bracket-supports being secured and tied by the clips or brackets, substantially as described.

7. In a liquid-purifying system, a distributing-trough formed in divisions, the bottom being continued in opposing plates, and rods to form a supporting-bracket, substantially as described.

8. In a liquid-purifying system, the combination of a distributer and a branch trough, with shields or dams located at the junction of the distributer and trough and the outer end of the trough, substantially as described.

9. In a liquid-purifying system, a distributing-main and branch pipes or troughs, the main having a dam beyond each junction.

10. In a liquid-purifying system, a distributing-main having a series of dams gradually decreasing in size in the direction of the flow of the liquid.

In testimony whereof I affix my signature in presence of two witnesses.

JOHN JEROME DEERY.

Witnesses:
CORA HALL,
M. E. MADDEN.